June 12, 1962 J. B. JONES ETAL 3,038,359
VIBRATORY DEVICE
Filed June 3, 1958
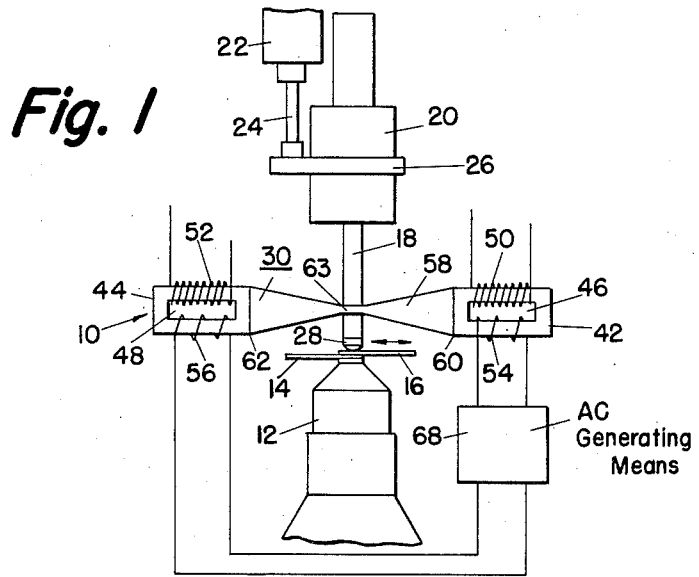
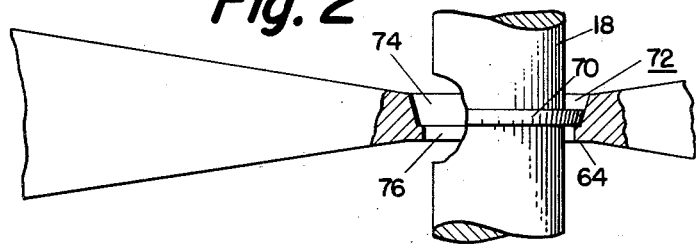
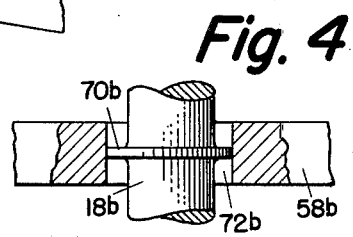
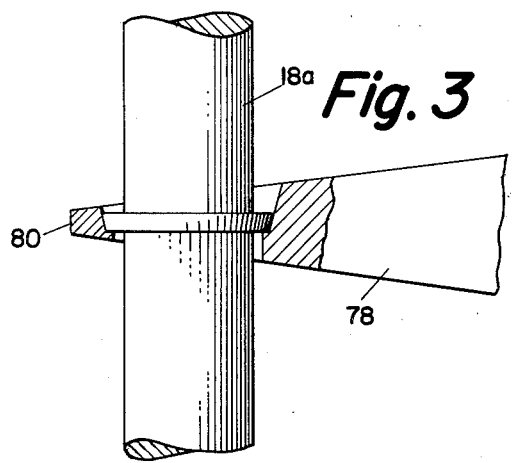
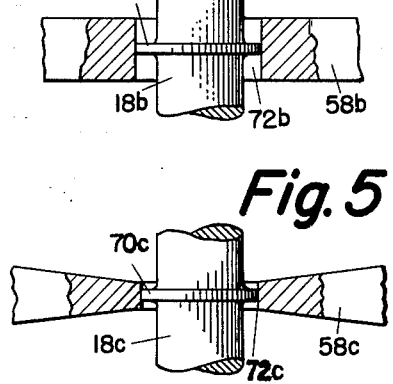
INVENTORS
JAMES BYRON JONES
ELMER E. WEISMANTEL
BY
Arthur H. Seidel
ATTORNEY

United States Patent Office 3,038,359
Patented June 12, 1962

3,038,359
VIBRATORY DEVICE
James Byron Jones, West Chester, and Elmer E. Weismantel, Chester, Pa., assignors to Aeroprojects Incorporated, West Chester, Pa., a corporation of Pennsylvania
Filed June 3, 1958, Ser. No. 739,504
5 Claims. (Cl. 78—82)

The present invention relates to a vibratory device, and more particularly to a construction for vibratory devices in which vibratory energy is delivered at a high power level from a member angularly disposed to the means producing the vibratory energy.

In devices in which it is necessary to deliver vibratory energy at a high power level, and particularly in ultrasonic or vibratory devices where the member engaged with the workpiece receiving the energy is engaged with the workpiece at an appreciable force level, the satisfactory joining of the component elements making up the vibratory device has presented a problem. Extensive experience has shown that the joints between coupling members and power transmission members in a vibratory device, that is the transducer-coupling system, are subjected to enormous stresses, and generally constitute the portion of such devices most prone to failure. In particular, in vibratory devices in which a reed which is engaged with a workpiece is perpendicularly disposed in respect to a coupler engaged with a transducer, the design of a satisfactory joint between the coupler and the reed which will have a long useful operating life has proved to be most difficult.

This invention has as an object the provision of a vibratory device having a long useful operating life.

This invention has as another object the provision of a vibratory device capable of delivering vibratory energy at high power levels without excessive failures of the device.

This invention has as yet another object the provision of a vibratory welder.

Other objects will appear hereinafter.

For the purpose of illustrating the invention there are shown in the drawings forms which are presently preferred; it being understood, however, that this invention is not limited to the precise arrangements and instrumentalities shown.

Referring to the drawings, wherein like reference characters refer to like parts;

FIGURE 1 is a side elevational view of a welder embodiment of the present invention.

FIGURE 2 is a fragmentary sectional view of a portion of the welder embodiment of the present invention shown in FIGURE 1.

FIGURE 3 is a fragmentary sectional view of another embodiment of the present invention.

FIGURE 4 is a fragmentary sectional view of yet another embodiment of the present invention.

FIGURE 5 is a fragmentary sectional view of yet another embodiment of the present invention.

Referring to the drawings and initially to FIGURES 1 and 2 there is shown therein a welder designated generally by the numeral 10. The welder is of the type disclosed in copending United States patent application Serial No. 739,503, filed on June 3, 1958 for "Apparatus for Introducing High Levels of Vibratory Energy to a Work Area" in the name of James Byron Jones, Elmer E. Weismantel, and Carmine F. De Prisco.

The welder 10 includes the reflector anvil 12 for the workpieces 14 and 16.

A reed 18, hereinafter referred to as sonotrode 18, is rigidly secured to the downwardly urged mass 20, and is spaced from and in axial end-to-end juxtaposition to the reflector anvil 12.

A variety of means may be provided for pressure-urging the sonotrode 18 towards the juxtaposed uppermost face of the reflector anvil 12. In the illustrated embodiment such means include the hydraulic cylinder 22, the piston 24 for such cylinder 22, and the flange 26 which is secured to both the piston 24 and the mass 20.

The sonotrode 18 is vibrated laterally, namely its tip 28 assumes the path generally indicated by the double-headed arrow at FIGURE 1, due to the action of the double transducer and double coupler designated generally by the numeral 30.

It is to be understood that a wide variety of useful transducers are known to those skilled in this art. However, for operation at high power levels in the frequency range of paramount significance, magnetostrictive transducers are presently preferred. Such magnetostrictive transducers consist of a magnetostrictive metal, such as nickel-iron alloy, iron-cobalt alloy, or Alfenol (an aluminum-iron alloy), properly dimensioned to insure axial resonance with the frequency of the alternating current applied thereto so as to cause it to decrease or increase in length according to its coefficient of magnetostriction. Magnetostrictive transducers are presently preferred for operation at frequencies of up to about 75,000 cycles per second, although they can be used at other frequencies. While magnetostrictive transducers are presently preferred in the apparatus of the present invention, alternatively other forms of transducers may be used. A wide variety of transducers are presently available, many of which have good physical properties and which exhibit appreciable changes in physical dimensions under the influence of electric current or an electric potential. Examples of suitable transducers include electrostrictive ceramics, such as barium titanate, lead zirconate, etc., or a natural piezoelectric material, such as quartz crystals. Preferably, although not necessarily, the last-mentioned materials are used at high frequency operations, as at frequencies above about 75,000 cycles per second. Other transducers which may be used in the apparatus of the present invention include ferroelectric materials or an electromagnetic device, such as that which actuates a radio loudspeaker.

In the illustrated embodiment wherein magnetostrictive transducers 42 and 44 are utilized, each of said transducers comprises a laminated core of nickel or other magnetostrictive metallic material, the transducers 42 and 44 having respective rectangularly shaped window openings 46 and 46 within their center portion. Each of the transducers 42 and 44 is provided with a polarizing coil, namely polarizing coil 50 for transducer 42 and polarizing coil 52 for transducer 44. Each of the transducers 42 and 44 is also provided with an excitation coil, namely transducer 42 is provided with excitation coil 54 and transducer 44 is provided with excitation coil 56. It will be understood by one skilled in the art that the frequency of the alternating current applied to the respective excitation coils 54 and 56 should be equal to the resonant mechanical frequency of the magnetostrictive transducers 42 and 44 in order that good efficiency will be produced by the system. Furthermore, it is necessary that the polarizing coils 50 and 52 be charged at a suitable level with D.C. current.

The transducers 42 and 44 are joined together by means of the double coupler 58. The double coupler 58 is a generally bowtie-shaped metal bar, as seen particularly in FIGURE 1, whose end portions 60 and 62 are respectively metallurgically joined, as by brazing or the like, to the transducers 42 and 44. The end portions 60 and 62 are relatively thick, and the double coupler 58 tapers inwardly, with its centermost portion 63 comprising the thinnest portion of the double coupler 58. The double coupler 58 should be dimensioned so as to resonate at the operating frequency of the transducers 42 and 44. Preferably, to avoid operational difficulties, both the transducers 42 and 44 should operate at the identical frequency, and preferably should be as closely identical in construction as is feasible.

Excitation energy for the excitation coils 54 and 56 is provided from generating means 68 which furnishes approximately one hundred eighty degrees out-of-phase alternating current to the excitation coils 54 and 56 of the transducers 42 and 44. The construction of generating means 68 in a form suitable for furnishing out-of-phase alternating current to the excitation coils 54 and 56 forms no part of the present invention, and such construction will be apparent to those having skill in the construction of driving systems for magnetostrictive transducers.

The joint between the double coupler 58 and the sonotrode 18 plays a most important role in the satisfactory performance of the apparatus of the present invention. For optimum performance it is desirable that the metallurgical joint between the sonotrode 18 and the double coupler 58 be as perfect as possible. Since in the subject invention, such joint comprises a brazed joint between metal members, a variety of filler metals more commonly known as brazing alloys may be used, with the preferred brazing alloy being a silver brazing alloy. The radial clearance between the sonotrode 18 and the double coupler 58 is important, and with a silver brazing alloy should be between 0.0005- to 0.0015-inch for maximum strength. With other types of brazing alloys different clearances may be utilized to produce optimum joints. The optimum clearances for any given brazing alloy may be readily ascertained by anyone skilled in the art from any of the standard references on metallurgical joining, or from the manufacturer of the brazing alloy. The joint between the sonotrode 18 and the double coupler 58 of the present invention permits the degree of clearance to be regulated so as to conform to the optimum requisite clearance for a given brazing alloy. It also insures the necessary precise control of alignment between sonotrode 18 and double coupler 58.

The sonotrode 18 is provided with an integral flange 70 which may have a tapered periphery. The flange 70 is received within a mating socket 72 which, in this example, comprises a tapered upper portion 74 and a radially inwardly projecting seat portion 76. As seen in FIGURE 2 the height of tapered portion 74 is appreciably greater than the axial dimension of flange 70, so that flange 70 is received within the tapered portion 74 of socket 72 and rests upon the seat portion 76, which locates the center plane of the reed flange 70 in the axial plane of the double coupler 58. As heretofore noted the clearance between the tapered portion 74 and the periphery of flange 70 can be closely regulated to conform to the optimum clearance for the particular brazing alloy which is being utilized to form the metallurgical bond.

The taper of tapered portion 74 and the outer periphery of flange 70 can be any angle between zero (a cylinder) and 60 degrees.

The subject construction permits both the flange 70 and the socket 72 to be tinned with brazing alloy and inspected prior to the formation of the joint. Moreover, it has been found that by utilizing an integral flange 70 of greater diameter than the diameter of the sonotrode body 18, the unit stress on the brazed joint is reduced, both because the cyclic stresses encountered in use are distributed over a greater area of braze and because the bending loads applied to the sonotrode 18 by the double coupler 58 and its transducers 42 and 44 are resisted by a joint having a somewhat greater moment arm resulting from the increased diameter of the flange. In addition to the foregoing, the subject joint is self-centering and permits a very clean brazed joint to be obtained with a minimum expenditure of excess braze metal.

As illustrative of the dimensioning of a double coupler 58, the following precise dimensions for a suitable double coupler will be given:

For a double coupler intended for use intermediate a pair of two inch by two and one-quarter inch nickel magnetostrictive transducers dimensioned for operation at fifteen kilocycles, a length intermediate the center and one of the transducers of 6.69 inches was found effective for a stanless steel double coupler. Such stainless steel double coupler was completely symmetrical, with each of its ends having a thickness of two and one-quarter inches, and its centermost portion 63 which extends for three-quarters of an inch on either side of the center of the coupler 58 having an overall thickness of 0.375-inch. The taper of the outside surface of the coupler 58 between its ends and centermost portion is an angle of about nine degrees based upon the longitudinal axis of the coupler, although this is not critical.

The perpendicular height of the tapered portion 74 of socket 72 is 0.250-inch, while the height of the seat portion 76 is 0.125-inch. The diameter of the seat portion 76 is 1.220-inch. The diameter of the base of the tapered portion is 1.301-inch and the tapered portion flares upwardly at an included angle to the vertical of about fifteen degrees, but this is not critical.

The perpendicular height of the flange 70 should be thick enough not to crack under the cyclic stresses encountered in use and thin enough to be flexible. For the instant joint a perpendicular height for flange 70 of 0.125-inch was found to be most satisfactory. It is preferred, as is heretofore noted, that the location of the center plane of flange 70 be on the plane of symmetry of double coupler 58, that is 0.1875-inch from the top or bottom faces of centermost portion 63 of double coupler 58.

In the construction shown in FIGURE 3, a single coupler 78 having a single magnetostrictive transducer (not shown) at its enlarged end remote from the sonotrode 18a is substituted for the double coupler 58. The single coupler 78 tapers inwardly to a blunted end 80. Of course, with a single coupler there is no means for furnishing one hundred and eighty degrees out-of-phase alternating current, since but a single magnetostrictive transducer is utilized in conjunction with the coupler. However, aside from the aforesaid differences, the construction shown in FIGURE 3 generally resembles the construction shown in FIGURE 2, with the form of the joint being identical in both constructions.

The constructions shown in FIGURES 2, 3, and 5 may be preferred because they permit precision assembly in the manufacture of the subject invention without the use of a jig or other assembly fixture.

However, if it is desired to use an assembly fixture to insure both precise alignment between the sonotrode and coupler, and the location of the flange within the receiving hole of the coupler so as to position the center plane of the reed flange on the longitudinal axis of the coupler, then the construction shown in FIGURE 4 may be utilized.

In the construction of FIGURE 4 the sonotorode 18b having an integral cylindrical flange 70b is secured by brazing within the matingly cylindrical socket 72b of double coupler 58b, which double coupler 58b generally resembles double coupler 58 of FIGURES 1 and 2 except for the substitution of cylindrical bored hole 72b for tapered socket 72.

In the construction of FIGURE 5, the sonotrode 18c having an integral cylindrical flange 70c is secured by brazing within the mating cylindrical socket 72c of double coupler 58c, which double coupler 58c generally resembles double coupler 58 of FIGURES 1 and 2 except for the substitution of the upper cylindrical portion of the socket 72c for the tapered upper portion of the socket 74.

Welding with the apparatus of the present invention is effected under a clamping force sufficient to hold the metal workpieces being welded in firm contact at the intended weld interface.

The clamping force may be varied over a wide range. In preferred embodiments, the maximum clamping force need not produce an external deformation [1] of more than about ten percent in weldments effected at room and ambient temperatures. In many cases the extent of deformation is appreciably below ten percent and in some instances may be virtually absent altogether. The minimal clamping force to be used in the process of our invention constitutes a force sufficient to maintain the metals being welded in regulated alignment and firm contact, e.g. contacting each other so that the weld may be effected by the application of vibratory energy.

The range of operative clamping pressures which may be employed in the process of the present invention may be readily ascertained by the user of the process. In all cases, the clamping force must be sufficient to effect coupling between the metals being welded and the source of vibratory energy, so that such vibratory energy may be transmitted to the metals.

A wide range of vibratory welding frequencies may be utilized with the apparatus of the present invention, with the optimum operating frequency lying between about 5,000 and 40,000 cycles per second. This optimum range of operating frequencies may be readily achieved by transducer elements of known design, which are capable of generating elastic vibratory energy of high intensity.

Welding with the apparatus of the present invention may be and in many instances is initiated at room temperatures or ambient temperatures without the application of heat.[2] If desired, welding may also be initiated at elevated temperatures below the fusion temperature (melting point or solidus temperature of any of the pieces being bonded).[3] Thus, heating the metals to be welded prior to, and/or during welding to a temperature below their fusion temperature may, in some cases, facilitate the ease of welding and lower the power requirements and/or time requisite to achieve welding. Welding in accordance with the apparatus of the present invention may be utilized to form both spot and overlapping-spot-seam welds.

Welding with the apparatus of the present invention may be applied to a wide variety of metals, examples of which include: pure aluminum to pure aluminum; aluminum alloy to aluminum alloy; copper to copper; copper to aluminum; brass to brass; magnesium alloy to magnesium alloy; nickel to nickel; stainless steel to stainless steel; silver titanium alloy to silver-titanium alloy; gold-platinum alloy to stainless steel; platinum to copper; platinum to stainless steel; gold-platinum alloy to nickel; titanium alloy to titanium alloy; molybdenum to molybdenum; aluminum to nickel; stainless steel to copper alloy; nickel to copper alloy; nickel alloy to nickel alloy; sintered aluminum powder to sintered aluminum powder.[4]

Spot-type welding with the apparatus of the present invention may be accomplished within a relatively wide time range, such as a time range of between about 0.001 second to up to about 6.0 seconds or somewhat more, with welding under most normal conditions being effected during a time interval of from several hundredths of a second to two seconds, most generally about 1.5 seconds.

The apparatus of the present invention may be modified, if desired, so as to permit welding in either highly evacuated atmospheres, or in selected atmospheres, such as atmospheres comprising an inert gas. However, the welding of most metals may be effected in the ambient atmosphere.

Welding with the apparatus of the present invention may usually be effected with metals, such as aluminum, and many aluminum alloys without the extensive precleaning required to effect satisfactory welding by other methods. However, a degree of precleaning and surface treatment may prove advantageous, and it is desirable prior to effecting welding to remove surface contaminants, such as hydrocarbon or other lubricants and the like.

While the description of the apparatus is directed to its use as a welder, it is to be understood that the apparatus of the present invention is not limited to applications in the welding of metals, but that the subject apparatus may be utilized for the delivery of vibratory energy at high energy levels for any purpose requiring the transducer-coupler-reed type of system.

The present invention may be embodied in other specific forms without departing from the spirit or essential attributes thereof and, accordingly, reference should be made to the appended claims, rather than to the foregoing specification as indicating the scope of the invention.

It is claimed:

1. Apparatus comprising an acoustical reed, an elongated vibration-transmitting means positioned generally perpendicularly with respect to said reed, means providing an acoustic-transmitting joint between said vibration-transmitting means and said reed, said joint comprising a thin radially outwardly directed integral flange on said reed, said vibration-transmitting means including a member having a hole therethrough, said flange being disposed in said hole, the outer periphery of said reed adjacent said flange being spaced radially inwardly from the wall defining said hole so as to be free from contact with said wall, and filler metal metallurgically joining the periphery of said flange and the wall of said hole.

2. Apparatus in accordance with claim 1 wherein said flange is flexible, whereby said flange may transmit cyclic stresses without cracking.

3. Apparatus in accordance with claim 1 in which the hole comprises a relatively narrow passageway extending within said vibration-transmitting means for a distance appreciably less than the thickness of said vibration-transmitting means and a relatively wide passageway contiguous to said relatively narrow passageway, with the lowermost face of said flange resting upon a shoulder disposed between said relatively narrow passageway and said relatively wide passageway, said shoulder lying in a plane substantially perpendicular to the longitudinal axis of said reed, and with the periphery of the flange being juxtaposed to the wall of the relatively wide passageway.

4. Apparatus in accordance with claim 3 in which the periphery of the flange and the relatively wide passageway are matingly tapered.

5. Apparatus in accordance with claim 3 in which the axial height of the flange is less than the axial height of the relatively wide passageway in the vibration-transmitting means.

References Cited in the file of this patent

UNITED STATES PATENTS

| | | |
|---|---|---|
| 1,255,469 | Schlieder | Feb. 5, 1918 |
| 1,435,010 | Lachman | Nov. 7, 1922 |
| 2,093,330 | Lundborg | Sept. 14, 1937 |
| 2,146,901 | Lane | Feb. 14, 1939 |
| 2,222,906 | Hentzen | Nov. 26, 1940 |
| 2,228,087 | Rose | Jan. 7, 1941 |

(Other references on following page)

---

[1] By deformation is meant the change in dimensions of the weldment adjacent the weld zone divided by the aggregate thickness of the weldment members prior to welding; result multiplied by 100 to obtain percentage.

[2] The weldment may be warm to the touch after the weld due to the application of the elastic vibratory energy.

[3] The temperatures to which the foregoing statements refer are those which can be measured by burying diminutive thermocouples in the weld zone prior to welding, as well as the temperatures which can be estimated or approximated from a metallographic examination of a cross-section of a vibratory weld in the ordinary magnification range of up to about 500 diameters.

[4] A mixture consisting of elemental aluminum and aluminum oxide.

UNITED STATES PATENTS

| | | |
|---|---|---|
| 2,236,186 | Murray | Mar. 25, 1941 |
| 2,583,868 | Mocivn | Jan. 29, 1952 |
| 2,704,333 | Calosi et al. | Apr. 15, 1955 |
| 2,779,612 | Edelen | Jan. 29, 1957 |
| 2,804,725 | Dench | Sept. 3, 1957 |

FOREIGN PATENTS

| | | |
|---|---|---|
| 1,087,439 | France | Aug. 25, 1954 |
| 1,087,440 | France | Aug. 25, 1954 |
| 705,569 | Great Britain | Mar. 17, 1954 |